(12) United States Patent
Woltmann et al.

(10) Patent No.: US 7,819,086 B2
(45) Date of Patent: Oct. 26, 2010

(54) PET TOY WITH VENT OPENING

(75) Inventors: Klaus Woltmann, Demarest, NJ (US); Jonathan Willinger, Tenafly, NJ (US)

(73) Assignee: JW Pet Company, Inc., Teterboro, NJ (US)

(*) Notice: Subject to any disclaimer, the term of this patent is extended or adjusted under 35 U.S.C. 154(b) by 323 days.

(21) Appl. No.: 11/118,820

(22) Filed: Apr. 29, 2005

(65) Prior Publication Data

US 2006/0243218 A1    Nov. 2, 2006

(51) Int. Cl.
     A01K 29/00    (2006.01)

(52) U.S. Cl. .................................. 119/710; 119/707

(58) Field of Classification Search ............. 119/707, 119/709, 710, 711
     See application file for complete search history.

(56) References Cited

U.S. PATENT DOCUMENTS

| 848,136 A | 3/1907 | Smith |
| 1,022,112 A | 4/1912 | Smith |
| 1,534,964 A | 4/1925 | Kahnweiler |
| 2,086,631 A | 7/1937 | Munro |
| D188,179 S | 6/1960 | Tay |
| 4,802,444 A | 2/1989 | Markham et al. |
| 5,553,570 A | 9/1996 | VanNatter, III et al. |
| 5,813,366 A | 9/1998 | Maudlin, Jr. |
| 5,865,147 A | 2/1999 | Rubin |
| 5,947,061 A * | 9/1999 | Markham et al. ............ 119/710 |
| 5,965,182 A | 10/1999 | Lindgren |
| 6,003,470 A * | 12/1999 | Budman ..................... 119/711 |
| 6,098,571 A | 8/2000 | Axelrod et al. |
| 6,186,095 B1 | 2/2001 | Simon |
| 6,237,538 B1 | 5/2001 | Tsengas |
| 6,557,496 B2 | 5/2003 | Herrenbruck |
| D480,518 S | 10/2003 | McGinty |
| D497,457 S | 10/2004 | Willinger |

OTHER PUBLICATIONS www.busybuddytoys.com wayback archive Apr. 12, 2004 4 pages
www.kongcompany.com wayback archive Aug. 2, 2003 2 pages.*

* cited by examiner

*Primary Examiner*—Yvonne R Abbott
*Assistant Examiner*—Monica Williams
(74) *Attorney, Agent, or Firm*—Myers Wolin, LLC

(57) ABSTRACT

A pet toy has an outer wall and a first opening in the outer wall that extends into an interior of the pet toy, a portion of the interior being hollow. At least one second opening is defined in the outer wall and functions as a vent to prevent a pet's tongue from becoming inadvertently and harmfully sealed within the first opening.

12 Claims, 3 Drawing Sheets

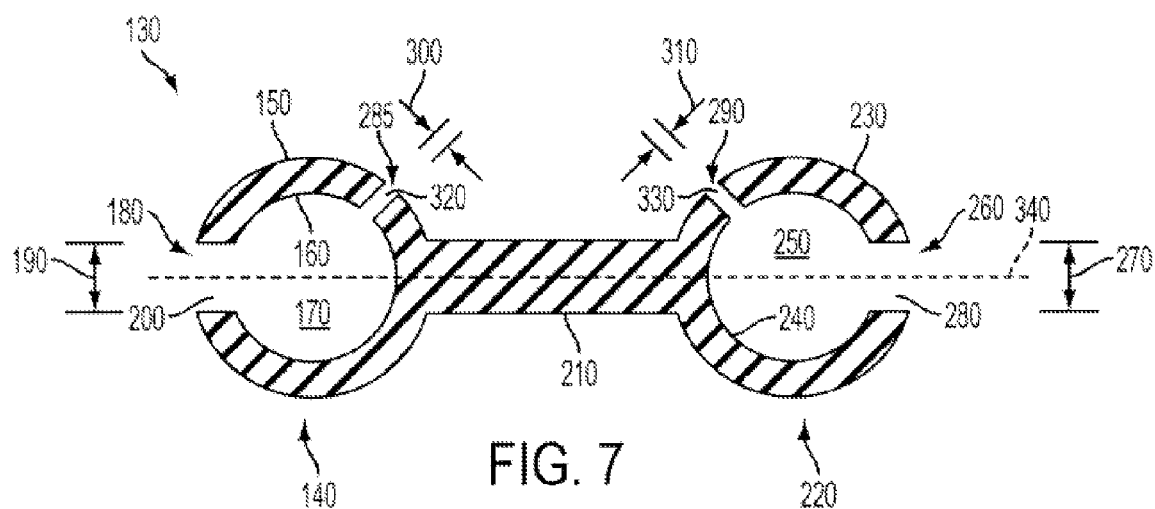

PET TOY WITH VENT OPENING

FIELD OF THE INVENTION

The present invention relates to pet toys in general, and more particularly to a pet toy with a vent opening to alleviate suction conditions that might endanger a pet's tongue or other body part.

BACKGROUND OF THE INVENTION

Rubber pet toys usually have hollow interiors to allow for biting and chewing compression of the exterior of the toy. The deflection of the pet toy walls under the jaws of the animal enhances the overall chewing experience and helps the animal develop strong jaw muscles. This experience is made even more enjoyable if the hollow interior is filled with a noise maker or dispensable treat as is known in the art.

However, regardless of whether the toy is filled with a treat or the like, some animals have a tendency to get their tongues stuck in the opening that leads to the hollow interior. This occurs when the animal's tongue saliva forms a seal with walls of the opening. In certain situations, the seal can be so tight that veterinarian intervention is required to separate the toy from the animal. In drastic situations, surgical removal of part of the tongue becomes necessary.

SUMMARY OF THE INVENTION

A pet toy is provided with an outer wall and a first opening in the outer wall that extends into an interior of the pet toy, a portion of the interior being hollow. The first opening and the hollow interior enable the pet to compress the outer wall upon chewing or biting. At least one second opening is defined in the outer wall and functions as a vent to alleviate suction and prevent a pet's tongue from becoming harmfully sealed within the first opening. The second opening has a diameter that is appreciably less than the diameter of the first opening to prevent a pet's tongue from passing through the second opening and becoming caught or sealed therein.

BRIEF DESCRIPTION OF THE DRAWINGS

FIG. 7 is a cross-section taken through line 7-7 of FIG. 6.

FIG. 8 illustrates a pet toy in accordance with another embodiment of the present invention.

DETAILED DESCRIPTION OF THE PREFERRED EMBODIMENTS

Figure 1:
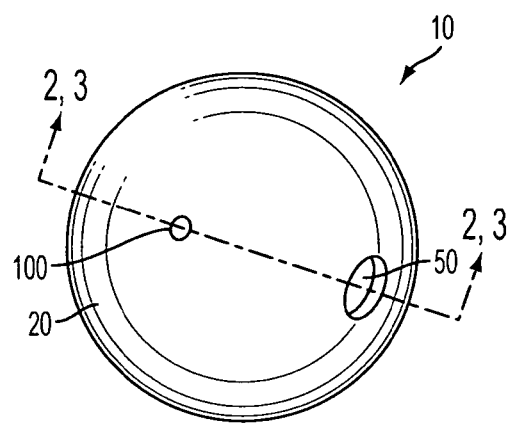
FIG. 1 illustrates a pet toy in accordance with one embodiment of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 2:
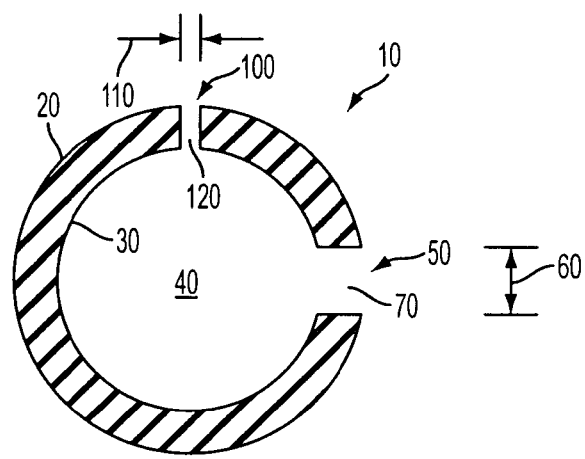
FIG. 2 is a cross-section taken through line 2-2 of FIG. 1.
Figure 3:
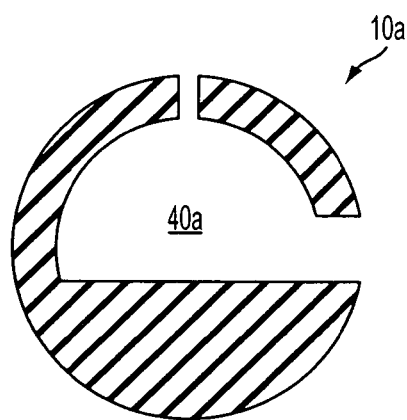
FIG. 3 is a cross-section taken through line 3-3 of FIG. 1 of an alternative embodiment of a pet toy of the invention.

FIG. 1 is a perspective view and FIG. 2 is a cross-sectional view of a pet toy 10 having an outer wall 20, an inner wall 30 and a hollow interior 40. While FIG. 2 shows a substantially hollow interior 40, the interior 40a could also be partially hollow as shown in connection with the pet toy 10a of FIG. 3. The interior 40 is at least partially hollow to enable compression of the outer wall 20 upon chewing or biting.

Figure 4:
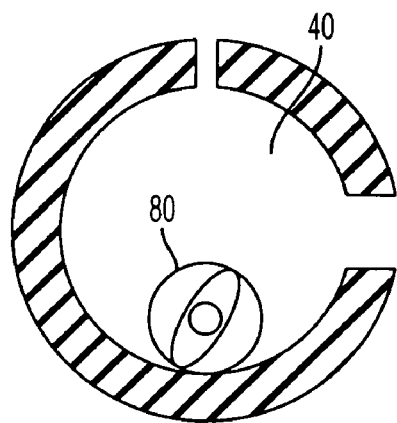
FIG. 4 illustrates a pet toy in accordance with an embodiment of the invention.
Figure 5:
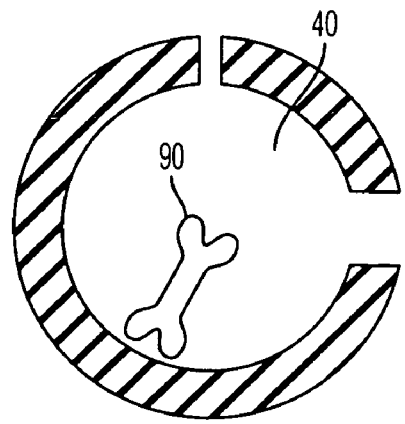
FIG. 5 illustrates a pet toy in accordance with an embodiment of the invention.

A first opening 50 with a diameter 60 extends between the outer wall 20 and inner wall 30 and defines a first passage 70 to the interior 40. Such first passage 70 may facilitate the manufacturing of the pet toy 10 (i.e. serving as a passage for removing a molding core) and/or the insertion of a sound device such as, for example, a bell 80 (FIG. 4), and/or an edible treat 90 (FIG. 5) into the interior 40. Of course, other objects or combinations of objects may be inserted into the interior 40 as desired.

To prevent a pet's tongue from becoming caught or sealed within the first opening 50, the diameter of which is preferably at least 0.125 inches for example, a second opening 100 with a diameter 110 extends between the outer wall 20 and inner wall 30 and defines a second passage 120 to the interior 40. The second opening 100 functions as a vent to alleviate any suction generated if a pet's tongue becomes caught or sealed within the first opening 50, and the diameter 110 should be dimensioned to allow air to pass through the second passage 120 and into the interior 40. The diameter 110 of the second opening 100 is therefore appreciably less than the diameter 60 of the first opening 50 as the second passage 120 is generally not needed to facilitate manufacturing, and it is generally ineffective as a means for insertion of a sound device, edible treat or the like. Accordingly, the diameter 110 of the second opening 100 is preferably within a range of approximately ten to twenty percent (not shown to scale in the drawings) that of the diameter 60 of the first opening 50, although the second opening 100 could fall outside such range as desired. The second opening 100 is also spaced a sufficient distance away from the first opening 50 so that a pet's tongue could not extend into the interior 40 and cover both the first and second openings 50, 100 simultaneously from the interior 40, thus rendering ineffective the second opening 100. Such distance may, for example, approximate 0.25 inches along the inner wall 30.

Thus, FIGS. 1-5 illustrate several embodiments of a pet toy having a single, substantially enclosed interior that is accessed by a single primary opening and is vented by a single vent opening of appreciably smaller diameter and sized to be just large enough to allow air to pass into the single interior. It is not necessary for the vent opening to have a considerable size, or to approach the same size as the primary opening, particularly because its intended function is a pressure or suction release. Therefore, the vent opening can be as small as a pin hole as long as it can relieve a suction condition generated at the primary opening.

Figure 6:
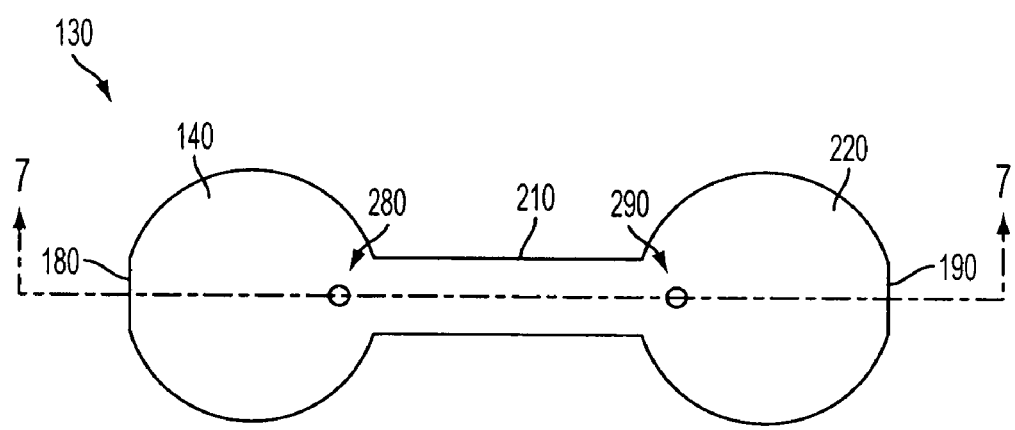
FIG. 6 illustrates a pet toy in accordance with another embodiment of the present invention.

FIG. 6 is a perspective view and FIG. 7 is a cross-sectional view of an alternative embodiment of a pet toy 130 comprising a first end 140 having an outer wall 150, an inner wall 160 and an interior 170, a portion of which is hollow to enable compression of the outer wall 150 upon chewing or biting. A first opening 180 with a diameter 190 extends between the outer wall 150 and inner wall 160 and defines a first passage 200 to the interior 170. Such first passage 200 may facilitate the manufacturing of the pet toy 130 and/or the insertion of a sound device or edible treat as described above in connection with FIGS. 4 and 5 above. A bridge 210 is defined between the first end 140 of the pet toy 130 and a second end 220 of the pet toy 130, the second end 220 having an outer wall 230, an inner wall 240 and an interior 250, a portion of which is hollow to enable compression of the outer wall 230 upon chewing or biting. A first opening 260 with a diameter 270 extends between the outer wall 230 and inner wall 240 and defines a first passage 280 to the interior 250. Such first passage 280 may facilitate the manufacturing of the pet toy 130 and/or the insertion of a sound device or edible treat as described above in connection with FIGS. 4 and 5 above.

Similar to the embodiment of FIGS. 1-5, a second opening 285, 290 with a diameter 300, 310 extends between the outer wall 150, 230 and inner wall 160, 240 and defines a second passage 320, 330 to the interior 170, 250 of the first and second ends 140, 220 respectively. Each of the second openings 258, 290 functions as a vent to allow for the introduction of air into the interior 170, 250 and alleviate any suction generated if a pet's tongue becomes caught or sealed within the passages 200, 280 of the first openings 180, 260 respectively. The first openings 180, 260 in the embodiment of FIGS. 6-7 are defined along the longitudinal axis 340 of the pet toy 130, while the second openings 285, 290 are defined along dissimilar axes, or axes that intersect the longitudinal axis 340. The second openings 285, 290 are preferably spaced from the first openings 180, 260 such that a pet's tongue could not simultaneously seal off the first and second openings from within the interiors of the toy. Of course, other positional arrangements are contemplated.

FIG. 8 illustrates an alternative embodiment of a pet toy 300 comprising a first end 310 having an outer wall 320, an inner wall 330 and an interior 340, a portion of which is hollow to enable compression of the outer wall 320 upon chewing or biting. A first opening 350 with a diameter 360 extends between the outer wall 320 and inner wall 330 and defines a first passage 370 to the interior 340. Such first passage 370 may facilitate the manufacturing of the pet toy 300 and/or the insertion of a sound device or edible treat as described above in connection with FIGS. 4 and 5 above. A bridge 380 is defined between the first end 310 of the pet toy 300 and a second end 390 that is solid. Thus, the first end 310 of pet toy 300 presents a compressive chewing experience, while the second end 390 presents more of a biting experience.

To prevent a pet's tongue from becoming caught or sealed within the first passage 370 of the first opening 350, a second opening 400 with a diameter 410 extends between the outer wall 320 and inner wall 330 and defines a second passage 420 to the interior 340. The second opening 400 functions as a vent to alleviate any suction generated if a pet's tongue becomes caught or sealed within the first passage 370. The diameter 410 of the second opening 400 is appreciably less than the diameter 360 of the first opening 350, and could approach a pin hole as described above. A third opening 430 with a diameter 440 may be provided between the outer wall 320 and inner wall 330 and define a third passage 450 to the interior 340. Such third opening 430 may provide enhanced venting of the interior 340, acting in concert with the second opening 400 if one of the openings 400, 430 acting alone would not provide sufficient pressure relief for a dangerous suction condition occurring at the first opening 350. This might occur if one of the openings 400, 430 was too small or became inadvertently blocked. The diameter 440 of the third opening 430 can be the same or different from the diameter 410 of the second opening 400, with each diameter 440, 410 being appreciably less than the diameter 360 of the first opening 350.

The pet toy of the present invention is preferably formed of an elastomeric material, which is preferably natural rubber, synthetic rubber, or a blend of natural rubber or synthetic rubber and a plurality of blending polymers. Natural rubber is generally preferred by pets because it is soft and easy to deform and chew. Of course, other materials that are not as elastic are contemplated.

The pet toy of the present invention may also be formed in any shape or size and have cross-sections of any shape and wall thickness. In addition, while a pet toy having one or two hollow interiors is shown, a pet toy having more than two interiors is also contemplated. Furthermore, the pet toy of the present invention is preferably formed as a single, one-piece molded object, although other constructions are contemplated.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A pet toy comprising:
   a) a circular bulbous end portion connected to a second portion and having an outer wall enclosing a substantially hollow interior and defined at tangential ends of a diameter that defines the circular bulbous end portion
   b) an opening in the outer wall of at least 0.125 inches that extends into the substantially hollow interior and is dimensioned to allow access to a pet's tongue into the substantially hollow interior, the opening defined at the outermost portion of the diameter of the end portion; and
   c) a pin hole that is smaller than the opening and is defined through the outer wall;
   d) wherein the pin hole is dimensioned to allow outside air to pass through the outer wall and into the interior to alleviate suction and prevent a pet's tongue from becoming sealed within the opening; and
   e) wherein the opening is defined along a first radial position defining the longitudinal axis of the end portion, and wherein the pin hole is defined along a second radial position of the end portion that is different from the first radial position and is spaced from the opening a distance sufficient to prevent a pet's tongue from sealing the pin hole from the substantially hollow interior.

2. A pet toy in accordance with claim 1, wherein the opening has an opening diameter that is greater than or equal to ten times the opening diameter of the pin hole.

3. A pet toy in accordance with claim 1, wherein the pet toy is molded in one piece out of natural rubber.

4. A pet toy in accordance with claim 3, wherein the first opening extends through the outer wall only once.

5. A pet toy in accordance with claim 1, wherein the opening extends through the outer wall only once.

6. A pet toy in accordance with claim 1, wherein the opening and the pin hole are the only openings in the outer wall relative to the substantially hollow interior.

7. A pet toy comprising:
a) a first circular bulbous end and a second circular bulbous end and a solid bridge between the first and second ends;
b) the first end having a first outer wall, a first opening of at least 0.125 inches in the outermost portion of the first outer wall along a longitudinal axis of the pet toy and a radial position of the first end that defines a first interior in said one-first end, a portion of the first interior being hollow and having a radius, the first opening being dimensioned to allow access to a pet's tongue into the first interior; and
c) the first end having a pin hole in the first outer wall that extends into the first interior;
d) wherein the pin hole is smaller than the first opening and is dimensioned to allow outside air to pass through the first outer wall and into the interior to alleviate suction and prevent a pet's tongue from becoming sealed within the first opening;
e) wherein the first opening terminates at the end of a first radial position tangential to the outer wall and through the first interior along the longitudinal axis of the pet toy, and wherein the pin hole terminates at the end of a second radial position tangential to the outer wall that is different from the longitudinal axis and is spaced from the first opening a distance sufficient to prevent a pet's tongue from sealing the pin hole from the first interior; and
f) wherein the pet toy is a one-piece, molded construction.

8. A pet toy in accordance with claim 7, wherein the first opening has an opening diameter that is greater than or equal to five times the diameter of the pin hole.

9. A pet toy in accordance with claim 8, wherein the first opening has an opening diameter that is greater than or equal to ten times the diameter of the pin hole.

10. A pet toy in accordance with claim 7, wherein the second end further comprises a second outer wall, a third opening in the outermost portion of the second outer wall that defines a second interior in said second end, a portion of the second interior being hollow, a fourth opening in the second outer wall that is another pin hole and that extends into the second interior to prevent a pet's tongue from sealing the another pin hole from the second interior.

11. A pet toy in accordance with claim 10, wherein the first and third openings terminate along a longitudinal axis of the pet toy and the pin holes terminate along a different axis from the longitudinal axis.

12. A pet toy in accordance with claim 7, wherein the second end is solid and is joined to the first end by a bridge.

\* \* \* \* \*